United States Patent [19]

Walker, Jr.

[11] 4,057,678

[45] Nov. 8, 1977

[54] MOLTEN SALT BATTERY HAVING INORGANIC PAPER SEPARATOR

[75] Inventor: Robert D. Walker, Jr., Gainesville, Fla.

[73] Assignee: The United States of America as represented by the United States Energy Research and Development Administration, Washington, D.C.

[21] Appl. No.: 778,186

[22] Filed: Mar. 16, 1977

[51] Int. Cl.² ............................................. H01M 10/39
[52] U.S. Cl. .................................... 429/104; 429/247
[58] Field of Search ............... 429/103, 101, 247, 248, 429/252, 129, 246

[56] References Cited

U.S. PATENT DOCUMENTS

| | | | |
|---|---|---|---|
| 3,736,185 | 5/1973 | Smatko | 429/252 |
| 3,933,520 | 1/1976 | Gay et al. | 429/218 X |
| 4,011,374 | 3/1977 | Kaun | 429/103 X |

Primary Examiner—Anthony Skapars
Attorney, Agent, or Firm—Dean E. Carlson; David S. Zachry; Allen H. Uzzell

[57] ABSTRACT

A high temperature secondary battery comprises an anode containing lithium, a cathode containing a chalcogen or chalcogenide, a molten salt electrolyte containing lithium ions, and a separator comprising a porous sheet comprising a homogenous mixture of 2-20 wt.% chrysotile asbestos fibers and the remainder inorganic material non-reactive with the battery components. The non-reactive material is present as fibers, powder, or a fiber-powder mixture.

10 Claims, 1 Drawing Figure

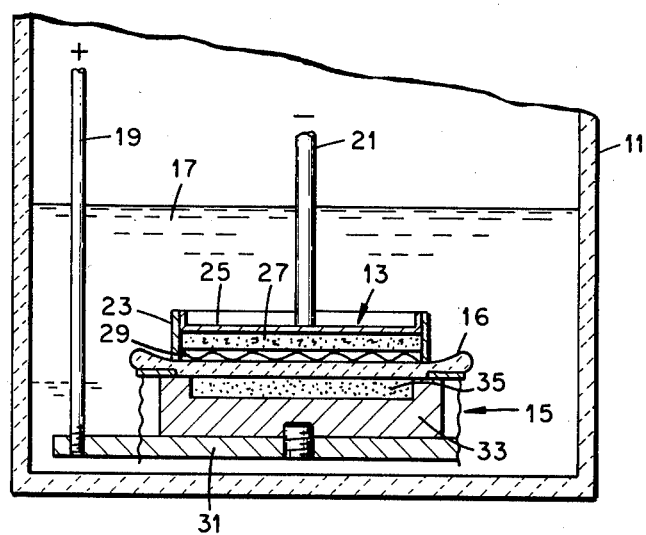

MOLTEN SALT BATTERY HAVING INORGANIC PAPER SEPARATOR

BACKGROUND OF THE INVENTION

This invention was made in the course of, or under, a contract with the Energy Research and Development Administration.

It relates in general to molten salt batteries, and more particularly to a porous separator for use in a battery having an anode comprising metallic lithium and molten salt electrolyte containing lithium ions.

In the prior art a variety of fused salt secondary batteries having electrodes containing metallic lithium have been described. In some batteries the lithium is molten, while in others the lithium is alloyed with metals such as aluminum, silicon, or boron to provide an alloy which is solid at the operating temperature of the battery, about 100° C. above the melting point of the electrolyte. For purposes of this invention, metallic lithium includes molten lithium and solid or liquid lithium alloys.

In compact batteries, the electrodes are disposed in close proximity with one another to minimize size and weight of the cell. Examples of such compact cells are fully described in commonly assigned U.S. Pat. Nos. 3,947,291; 3,933,520; and 3,933,521 which are incorporated herein by reference. In such compact designs the electrodes are separated by a porous separator to permit ionic transport and prevent electrical contact between the anode and the cathode should the cell components swell or otherwise move in contact with each other. The separator must be flexible to accommodate the above described volume changes during operation. It is the volume changes of the electrodes which made sintered ceramic separators unsuitable for use in compact electrochemical cells with lithium-containing anodes and chalcogen-containing cathodes.

A continuing effort has been aimed at developing a porous, flexible separator which is resistant to metallic lithium and molten lithium halide salts at elevated temperatures necessary to maintain the electrolyte in the molten state. Normally, molten salt batteries are operated at least about 100° C. above the melting point of the salt. For example, a KCl-LiCl eutectic electrolyte battery would be operated at about 450°–500° C. Separators of woven ceramic cloth such as yttria, boron nitride, calcium zirconate, and other materials resistant to the battery environment have been proposed. See, for example, U.S. Pat. No. 3,915,742, herein incorporated by reference. While such separators are sufficiently flexible to be used in contact with the cathode and anode, the opening 5 within the cloth where the roving crosses are a possible source of electrical short circuiting. Furthermore, the lower limit of separator thickness is dependent upon the roving diameter.

The present invention concerns the fabrication of porous paper-like separators which can be made very thin and which are not deleteriously affected by the battery environment. A serious difficulty in the fabrication of paper separators is that those materials which are resistant to attack by metallic lithium or molten lithium salts are poor sheet formers. Organic binders are unstable at the operating temperatures. Inorganic binders such as silicates, alumina, and zirconia have failed in screening tests of Li-Al alloy/$FeS_2$ batteries, resulting in short circuiting of the electrodes.

SUMMARY OF THE INVENTION

It is an object of this invention to provide a porous separator for molten salt batteries having an anode containing metallic lithium and a molten salt electrolyte containing lithium ions.

It is a further object to provide a separator which is resistant to reaction with metallic lithium at the operating temperatures of molten salt batteries and which can be utilized in contact with the anode.

It is a further object to provide a separator which is flexible and can be used in contact with the cathode, accommodating volume changes of electrodes containing chalcogens or chalcogenides.

These and other objects are accomplished in a molten salt battery comprising an anode containing metallic lithium, a cathode containing a chalcogen or chalcogenide, a molten salt electrolyte containing lithium ions in contact with said anode and said cathode, and a porous separator disposed between said anode and cathode for providing electrical insulation and ionic transport between said anode and cathode, the improvement wherein said separator comprises a porous sheet comprising a homogeneous mixture of 2–20 wt.% chrysotile asbestos fibers and the remainder of said homogeneous mixture inorganic material non-reactive with the anode and the electrolyte.

It is preferred that the non-reactive material be present at least partially as fibers. These fibers should be 0.5–10 microns in diameter (preferably 0.5–1 micron) and having an aspect ratio of 10–500. The non-reactive material can be virtually any material which is stable in the electrolyte and is non-reactive with metallic lithium in the anode at the operating temperature of the battery.

BRIEF DESCRIPTION OF THE FIGURE OF DRAWING

The single FIGURE of drawing is a cross sectional view of a molten salt battery comprising the separator of this invention.

DETAILED DESCRIPTION

The porous sheet of this invention has been found to be highly resistant to deleterious reactions with lithium in molten halide salts containing lithium ions. Because of this unexpected beneficial property the porous sheet of this invention is particularly useful as a separator in batteries having anodes containing metallic lithium and having a molten halide salt electrolyte containing lithium ions.

The anode can be molten metal or a lithium alloy which is solid at the operating temperature of the battery. The operating temperature is a function of the melting point of the electrolyte and is generally 300°–600° C. The preparation of lithium-aluminum alloy electrodes is fully described in U.S. Pat. No. 3,957,532. A lithium-silicon alloy electrode is fully described in U.S. Pat. No. 3,969,139. Other lithium alloys solid at the operating temperature are similarly useful as solid electrode materials.

As in some prior art molten salt battery designs, the active electrode materials can be in powder form, contained within a porous electrically conductive substrate; see, for example, U.S. Pat. Nos. 3,941,612 and 3,898,096, where the electrodes are spaced apart within the molten electrolyte and are separated by rigid ceramic separators such as graphite or alumina.

The cathode materials for the subject battery are selected from the chalcogens such as oxygen, sulfur, selenium, and tellurium and the chalcogenides, which are the binary chalcogen compounds. Examples of active cathode materials are sulfur and the sulfides such as $MoS_2$, MnS, FeS, $FeS_2$, CoS, NiS, $Ni_3S_3$, CuS, $Cu_2S$, ZnS, $Sb_2S_3$, $TiS_2$, $V_2S_3$, $TaS_2$ and combinations of these materials.

The molten salt electrolyte is a lithium halide-containing salt which is maintained at a temperature above its melting point during operation of the battery. The molten salt may be either a single lithium halide, a mixture of lithium halides, or a eutectic mixture of one or more lithium halides and other alkali metal or alkaline earth metal halides.

Typical examples of binary eutectic salts are LiCl-KCl, LiCl-$MgCl_2$, LiCl-NaCl, LiBr-KBr, LiF-RbF, LiI-KI and mixtures thereof. Two preferred binary salt eutectic mixtures are LiCl-KCl (melting point 352° C.) and LiBr-RbBr (melting point 278° C.).

Examples of ternary eutectics useful as the molten salt electrolytes include $CaCl_2$-LiCl-KCl, LiCl-KCl-$BaCl_2$, $CaCl_2$-LiCl-$BaCl_2$, and LiBr-$BaBr_2$-LiCl. Preferred ternary eutectic mixtures include those containing LiCl-LiF and LiI (melting point 341° C.) and LiCl, LiI and KI (melting point 260° C.).

As the battery discharges, lithium ions are provided at the anode and chalcogenide ions are provided at the cathode. The chalcogenide ions react with lithium ions from the molten electrolyte to form a lithium chalcogen compound, such as $Li_2S$, at the cathod. The difference in volume of the reaction products and reactants at the cathode cause substantial volumetric changes in the cathode. The high flexiblity and burst strength of the porous sheet enable it to be used as a separator in direct contact with a cathode which experiences substantial volumetric changes. Of course, the separator described herein is useful in less severe battery enviroments where electrical insulation and ionic transport are required.

According to this invention, it has been found that a porous sheet comprising a homogeneous mixture of 2-20 wt.% chrysotile asbestos fibers and the remainder inorganic material non-reactive with metallic lithium or molten lithium salts is useful as a separator in a molten salt battery. The chrysotile asbestos substantially enhances the strength and flexibility of porous separators pressed from inorganic fibers or fiber-powder mixtures. Though the asbestos fibers do react to some degree with the lithium at the anode, it has been found that no harmful volatile products are formed and the electrical insulative properties of the separator in the cell environment are not deleteriously affected. After several hundred hours in Li-Al alloy/KCl-LiCl/$FeS_2$ battery test cells, the cell with the separator of this invention comsisting of 10 wt.% chrysotile asbestos fibers and 90 wt.% $Y_2O_3$ fibers was observed to gain capacity during operation and did not fail during a 1000 hour test.

A suitable configuration for a secondary battery according to this invention is shown in the figure. The secondary battery is contained within ceramic crucible 11. The battery includes an anode 13 and a cathode 15 submerged within molten salt electrolyte 17. Electrical conductors 19 and 21 extend from the cathode and anode, respectively, for connection to the terminals (not shown). The separator 16 separates the positive and negative electrodes while permitting ionic current flow during operation of the cell. The anode 13 is held within a support ring 23 and a cover 25 in electrical communication with conductor 21. The active electrode material is 50-50 atom percent Li-Al alloy powder, vibratorily compacted within a porous Ni substrate 27 that is tightly fitted into ring 23. The anode 13 comprises metallic mesh 29 to retain particles of alloy material. The anode is in contact with the separator 16, which is held in compression between the anode 13 and cathode 15. Since the insulative properties of separator 16 are not deleteriously affected by reaction with metallic lithium, metallic mesh 29 is neccessary only to ensure retention of electrode particles, and can be eliminated if desired. The separator would then have a pore size sufficiently small to retain the electrode particles. Separator 16 will then be in direct contact with metallic lithium at the surface of substrate 27.

The cathode 15 is made up of an electrically conductive, electrochemically inert base structure 31, for instance molybdenum, that supports and makes electrical contact between conductor 19 and cathode housing 33 which is porous electrically conductive material such as carbon foam. Substrate 35 is of high porosity and contains the active cathode material in this case, $FeS_2$ powder. The preparation of the loaded porous substrates for the anode and cathode and examples of suitable equivalent materials are disclosed in detail in U.S. Pat. No. 3,933,520.

The electrolyte 17 that surrounds the two electrodes is the eutectic composition of LiCl-KCl. This salt is molten above 352° C. The operating temperature of this battery is 352°-600° C., with 450°-500° C. preferred. As the battery discharges, metallic lithium in the anode is oxidized, providing Li+ ions to the electrolyte. $FeS_2$ in the cathode is reduced, providing sulfide ions which combine with lithium ions from the electrolyte to form $Li_2S$. Since the volume of $Li_2S$ formed at the cathode is greater than the volume of the cathode reactants, the volume of the active cathode material changes substantially during operation. The porous substrates of the electrodes are subject to swelling during charging or discharging of the battery. The flexibility of separator 16 accommodates the volume changes.

It is not certain whether the fibrous structure of the asbestos is retained during operation of the cell. Preliminary results have indicated that asbestos fibers are no longer present upon disassembly of the battery. This may, however, be caused by the contraction of the electrolyte upon freezing. To protect against this possibility, it is preferred that the separator be held in compression, for example, between the electrodes 13 and 15 as shown. In this manner, the insulative properties of the separator are retained even if the asbestos is substantially all reacted.

Having described the general function and relationship between the separator and the battery system, the preparation of the separator will be more fully described. The separator of this invention comprises a porous sheet comprising a homogeneous mixture of 2-20 wt.% chrysotile asbestos fibers and the remainder inorganic material non-reactive with the anode and the electrolyte at the operating temperature. The separator can consist entirely of a sheet containing the homogeneous mixture or of the homogeneous mixture in combination with one or more base sheets to increase the strnegth. The porosity of the sheet is 40-80%. The major portion (greater than 50%) of the pore volume is present in pores having equivalent diameters less than 10 microns. Equivalent diameters are the diameters of cylinders having the same cross sectional area as the pores. The non-reactive material can be any inorganic compound or mixture which is stable at the operating temperature and non-reactive with lithium in the anode and with the molten salt electrolyte. Such materials are known in the prior art and include BN, $Y_2O_3$, $LiAlO_2$, AlN, BeO, $K_2TiO_3$, MgO, $Al_2O_3$, $ZrO_2$ CaO, and congruently melting mixed oxides such as $Y_3Al_5O_{12}$ and $Mg_3Y_2O_6$. The non-reactive material is present in the sheet as fibers or fiber-powder mixtures. When fiber-powder mixtures are used, the fiber content of the mixture should be at least 10 wt.%. The fibers should be 0.5–10 microns in diameter, preferably 0.5–1 micron. The aspect ratio (length to diameter ratio) can range from about 10–500. When the homogeneous mixture comprises more than about 20 wt.% particles they should be present at least 50 vol.% in the 1–10 micron range (equivalent area diameter). Smaller particles reduce permeability and larger particles provide larger pores. It is within the skill of the art to select fiber sizes and powder sizes to provide appropriate pore sizes in the separator. It is likely that separators suitable for some applications can be prepared wholly from non-reactive powder and chrysotile asbestos fibers.

Chrysotile asbestos is a hydrous magnesium silicate having the general formula $Mg_3Si_2O_5(OH)_4$. It occurs as veins in other rocks and is separated and broken. Fibers are ordinarily 125–300 A in diameter with aspect ratios on the order of $10^5$. The preferred form of chrysotile asbestos for battery separators is fuel cell grade, having a low iron content, as available from Quin-T Corp.

It is not yet understood how and to what extent asbestos is attacked in the battery environment. It is believed that the water of hydration is removed by the metallic lithium and/or the molten salt electrolyte. This distinguishes chrysotile asbestos from inorganic materials which are non-reactive with the anode and the electrolyte, and which make up the remainder of the homogeneous mixture in the separator.

Non-reactive fibers useful in the separator can be prepared by a variety of well known methods for preparing inorganic fibers. Many types of fibers are readily available from commercial sources. For example, yttria fibers can be prepared by impregnating rayon fibers with yttrium nitrate, followed by heating to decompose the nitrate and the rayon. Boron nitride fibers are prepared by extruding boric oxide fibers and heating to 1700° C. in ammonia. $Y_2O_3$ fibers are available from Zircar Products, Inc., 110 N. Main St., Florida, New York 10921. BN fibers are available from Carborundum Company, P.O. Box 337, Niagara Falls, New York 14302. $LiAlO_2$ fibers are available from Horizons, Inc., 2380 Mercantile Road, Cleveland, Ohio.

The thickness of the separator should be 10–125 mils. Normally, the thinnest separator consistent with electrical insulation requirements is desired. The porosity of the separator and the flexibility of the separator should be maximized consistent with other constraints. Preferably, the separator should be sufficiently flexible to be bent around a rod no larger than $\frac{1}{4} - 1\frac{1}{4}$ inch without cracking.

The Chrysotile asbestos content of the homogeneous mixture can range from 2–20 wt.%. Below 2 wt.% asbestos, the sheet has insufficient strength for battery fabrication. Above 20 wt.%, the reaction of asbestos with lithium or lithium ions during operation would deleteriously affect the insulation properties of the separator.

In one embodiment, the porous sheet of this invention is part of a composite separator having a base sheet of a homogeneous mixture of 10–60 wt.% (preferably 30–60 wt.%) asbestos, remainder non-reactive material, and a layer of homogeneous material comprising 2–20 wt.%, and preferably 5–10 wt.% asbestos, and the remainder non-reactive material. In the assembled battery the base sheet would be oriented toward the cathode since the cathode is unreactive with asbestos. The composite sheet then can have a higher overall asbestos concentration for increased strength, coupled with good resistance to electrochemical attack by the anode.

In a preferred embodiment, the homogeneous mixture containing asbestos can contain up to about 60 wt.% MgO powder, the remainder non-reactive fibers, to increase the strength of the separator.

The homogeneous mixture of this invention can be prepared by any suitable technique of mixing or dispersing fiber or fiber-powder mixture and pressing into a sheet. The following example illustrates a general laboratory-scale method for preparing porous sheets comprising homogeneous mixtures of chrysotile asbestos and non-reactive material.

EXAMPLE

Fibers can be dispersed in a conventional WARING or OSTERIZER (trademark) blender in deionized water or isopropanol. For fiber mixtures it is usually best to disperse them separately and then mix, or to begin with the most difficult to disperse, i.e. asbestos, and then add the more easily dispersed or more fragile fibers, e.g. $LiAlO_2$, and continue mixing until the desired dispersion has been obtained. In general, fiber concentrations of about 5 grams/liter, temperature of about 35° C. and deionized water are suitable for dispersion. Small amounts of wetting or dispersing agents such as isopropanol are helpful, particularly with BN fibers or powder. Lithium aluminate fibers are sometimes very brittle and must be separately dispersed before mixing. When the mixture contains powder, it is generally added to the fiber dispersion during mixing. Mixing times of 1–5 minutes give adequate dispersions, as judged by uniform appearance of the suspension and a lack of shreds or clots of undispersed fibers.

After the fibers or fiber-powder mixture is dispersed, the slurry is diluted to about 1 gram/liter, stirred well to mix and poured onto a Buchner funnel of sufficient depth, with conventional filter papers as a filter base. The suspension is stirred gently and convection currents are allowed to subside. Vacuum is then applied to speed filtration. Vacuum is continued until the sheet appears dry. The vacuum is then broken and the sheet removed from the filter and placed between blotters and metal plates and pressed, e.g. 10 psig, to dewater the sheet further. The blotters are then removed and the sheet set aside to dry. The filter paper is removed either before or after drying, whichever is practicable.

The physical properties of separators prepared from several fiber and fiber-powder mixtures are presented in the tables. Basis weight is weight per unit are. The average density is calculated from a knowledge of the component densities and the composition of the mixture. The porosity is calculated from the basis weight, the thickness, and the average density. The flexibility is reported as the number of sixteenths of an inch diameter of the smallest diameter rod around which the separator could be bent without cracking or separation.

As shown in Table 1, the burst strength and flexibility increase with increasing asbestos content. The permeability decreases with decreasing asbestos content. The $Y_2O_3$ fibers were smaller in diameter than the $LiAlO_2$ particles, which were about 10 microns. This difference accounts for the differences in porosity between sheets made from the two materials.

Table 2 demonstrates the effect of powder content on the physical properties. The MgO particles were about 1 micron in diameter, hence the low permeability. It can be seen that a larger particle concentration in the mixture can enhance strength when the asbestos content remains constant, and compensate in part for reducing the asbestos content.

Table 3 demonstrates the effect of various fiber-powder ratios on the physical properties. Again, it is shown that increased powder concentrations enhance burst strength. It appears that the best combination of properties is found in a 10 wt.% asbestos/40 wt.% $Y_2O_3$ fiber/50 wt.% $Y_2O_3$ powder mixture. Based upon this disclosure it is within the skill of the art to vary the proportions of asbestos, non-reactive fiber, and non-reactive powder to optimize the separator properties for a given battery environment. Permeability is not critical to the electrical performance of the separator, so long at ionic transport is permitted.

Table 1

Physical Properties of Two-Fiber Homogeneous Separators

| Composition*, wt. % | | | Basis Weight | | Mean Thickness mils | Average Density g/cm³ | Average Porosity, % | Flexibility, sixteenths of an inch | Burst Strength psi | Permeability × 10¹² | |
|---|---|---|---|---|---|---|---|---|---|---|---|
| Asb | YOF | LAF | mean, mg/cm² | std. dev. mg/cm² | | | | | | mean, cm² | std. dev. cm² |
| 2.5 | 97.5 | — | 93 | 0.9 | 36.5 | 4.94 | 0.80 | 17 | none | none | none |
| 5 | 95 | — | 95.1 | 5.6 | 36.9 | 4.88 | 0.79 | 17 | 0.6 | 1360 | 622 |
| 10 | 90 | — | 88.4 | 6.6 | 33.1 | 4.78 | 0.79 | 8 | 1.3 | 403 | 122 |
| 20 | 80 | — | 90.6 | 5.0 | 35.4 | 4.52 | 0.78 | 6 | 2.7 | 108 | 13.2 |
| 10 | — | 90 | 96.6 | 13.1 | 35.8 | 2.55 | 0.59 | 8 | 1.3 | 403 | 41.6 |
| 20 | — | 80 | 94.5 | 5.2 | 34.7 | 2.09 | 0.49 | 8 | 3.6 | 96.2 | 10.4 |

*F = Fibers
Asb = Asbestos
YO = $Y_2O_3$
LA = $LiAlO_2$

Table 2

Physical Properties of Fiber/Powder Homogeneous Separators

| Composition*, Wt. % | | | | Basis Weight | | Thickness | | Average Density, g/cm³ | Average Porosity % | Flexibility sixteenths of an inch | Burst Strength, psi | Permeability × 10¹² | |
|---|---|---|---|---|---|---|---|---|---|---|---|---|---|
| Asb | BNF | BNP | MgOP | mean, mg/cm² | std.dev. mg/cm² | mean, mils | std. dev. mils | | | | | mean, cm² | std. dev. cm² |
| 10 | 40 | 50 | — | 68.3 | 0.5 | 37.5 | 0.4 | 1.88 | 0.62 | 17 | 0.5 | 123 | 33 |
| 10 | 40 | — | 50 | 62.4 | 11.2 | 33.7 | 0.9 | 2.77 | 0.74 | 17 | 19.5 | 6.2 | 1.7 |
| 10 | 20 | 70 | — | 76.6 | 5.5 | 34.8 | 2.2 | 1.88 | 0.54 | 17 | 1.0 | 51.8 | 0.9 |
| 10 | 20 | — | 70 | cracked on drying | | | | | | | | | |
| 4 | 16 | 80 | — | 70.3 | 1.3 | 36.2 | 0.9 | 1.83 | 0.58 | 17 | 1.2 | 34.7 | 4.9 |
| 2 | 8 | 90 | — | 68.3 | 3.0 | 37.3 | 1.9 | 1.93 | 0.62 | 17 | 1.0 | 69.6 | 8.3 |
| 2 | 8 | — | 90 | cracked on drying | | | | | | | | | |

*F = Fiber
P = Powder
Asb = Asbestos

Table 3

Physical Properties of Fiber/Powder Homogeneous Separators Containing 10 wt. % Asbestos

| Composition*, wt.% | | | | | | Basis Weight | | Mean Thickness mils | Average Density g/cm³ | Average Porosity % | Flexibility sixteenths of an inch | Burst Strength psi | Permeability × 10¹² | |
|---|---|---|---|---|---|---|---|---|---|---|---|---|---|---|
| BNF | BNP | YOF | YOP | LAF | LAP | mean mg/cm² | std. dev. mg/cm² | | | | | | mean, cm² | std. dev. cm² |
| 20 | 70 | — | — | — | — | 72.4 | 3.8 | 38.8 | 1.88 | 0.61 | 10 | 0.7 | 172 | 7.6 |
| 40 | 50 | — | — | — | — | 68.3 | 0.3 | 37.5 | 1.88 | 0.62 | 17 | 0.5 | 123 | 3.3 |
| — | — | 20 | — | 70 | — | 110.8 | 7.4 | 38.9 | 3.05 | 0.63 | 8 | 1.7 | 312 | 52.5 |
| — | — | 40 | 50 | — | — | 105.9 | 5.0 | 35.8 | 4.77 | 0.76 | 6 | 1.5 | 942 | 92 |
| — | — | 40 | — | — | 50 | 104.8 | 4.3 | 43.8 | 3.54 | 0.73 | 17 | 2.7 | 115 | 20 |
| — | — | — | 50 | 40 | — | 105.6 | 6.1 | 32.6 | 3.78 | 0.66 | 4 | 2.3 | 159 | 33 |
| — | — | — | — | 40 | 50 | 85.1 | 5.5 | 39.0 | 2.55 | 0.62 | 17 | 4.7 | 184 | 11 |

*F = Fiber
P = Powder
YO = $Y_2O_3$
LA = $LiAlO_2$

What is claimed is:

1. In a molten salt battery comprising an anode containing metallic lithium, a cathode containing a chalcogen or chalcogenide, a molten salt electrolyte containing lithium ions in contact with said anode and said cathode, and a porous separator disposed between said anode and cathode for providing electrical insulation and ionic transport between said anode and cathode, the improvement wherein said separator comprises a porous sheet comprising a homogeneous mixture of 2–20 wt.% chrysotile asbestos fibers and the remainder of said homogeneous mixture inorganic material non-reactive with the anode and the electrolyte.

2. The battery of claim 1 in which said separator is in contact with said anode.

3. The battery of claim 1 in which said separator is in contact with said cathode.

4. The battery of claim 1 in which said separator is held in compression between said anode and said cathode.

5. The battery of claim 1 in which said material non-reactive with the anode and electrolyte is present at least 10 wt.% as fibers 0.5–10 microns in diameter and having an aspect ratio of 10–500.

6. The battery of claim 1 in which said material non-reactive with anode and electrolyte is present as fibers 0.5–10 microns in diameter and having an aspect ratio of 10–500.

7. The battery of claim 1 in which said chrysotile asbestos fiber is present within the range of 5–10 wt.% in said homogeneous mixture.

8. The battery of claim 1 in which said inorganic material inert to the anode and to the electrolyte is selected from the group of BN, $Y_2O_3$, $LiAlO_2$, AlN, BeO, $K_2TiO_3$, $Al_2O_3$, $ZrO_2$, CaO, $Y_3Al_5O_{12}$, $Mg_3Al_5O_{12}$, $Mg_3Y_2O_6$.

9. The battery of claim 1 in which said homogeneous mixture further comprises 10–60 wt.% MgO powder.

10. The battery of claim 1 in which said non-reactive material is $Y_2O_3$.

* * * * *